2 Sheets--Sheet 1.

H. C. BURK.
Animal-Traps.

No. 158,778. Patented Jan. 19, 1875.

Witnesses.
J. B. Holderby
J. M. Rogers

Inventor.
Hiram C Burk
per his attorneys
R. S. & A. P. Lacey

2 Sheets--Sheet 2.

H. C. BURK.
Animal-Traps.

No. 158,778.   Patented Jan. 19, 1875.

Witnesses.
J. B. Helderly
J. M. Rogers

Inventor.
Hiram C. Burk
per his Attorneys
R. S. & A. P. Lacey

UNITED STATES PATENT OFFICE.

HIRAM C. BURK, OF ZOAR STATION, OHIO.

IMPROVEMENT IN ANIMAL-TRAPS.

Specification forming part of Letters Patent No. 158,778, dated January 19, 1875; application filed September 24, 1874.

*To all whom it may concern:*

Be it known that I, HIRAM C. BURK, of Zoar Station, in the county of Tuscarawas and State of Ohio, have invented certain new and useful Improvements in Rat-Traps; and I do hereby declare that the following is a full, clear, and exact description thereof, which will enable others skilled in the art to which it pertains to make and use the same, reference being had to the accompanying drawings, and to the letters of reference marked thereon, which form a part of this specification.

My invention relates to traps for catching rats. It consists in arranging, in connection with the several rooms or chambers into which the box or casing of the trap is divided, a series of treadles, catches or triggers, levers, and weights, by which the rat, on entering the box, springs the trap, and, in passing through the succeeding chamber, resets the devices for catching another rat.

Figure 1:
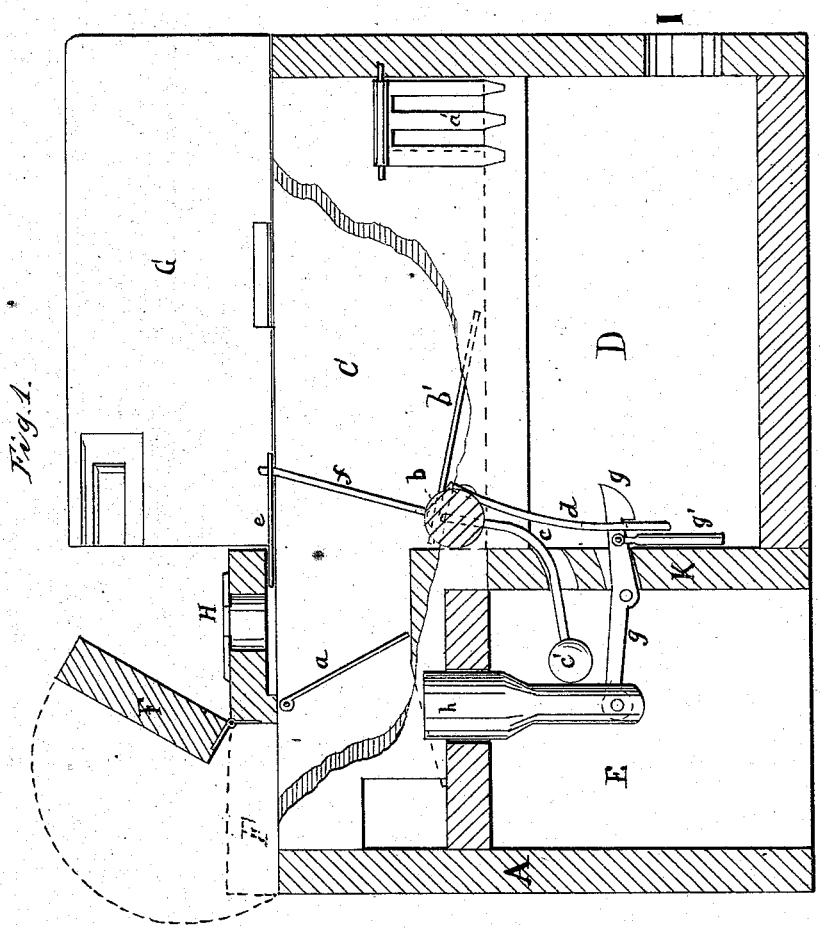
Figure 2:
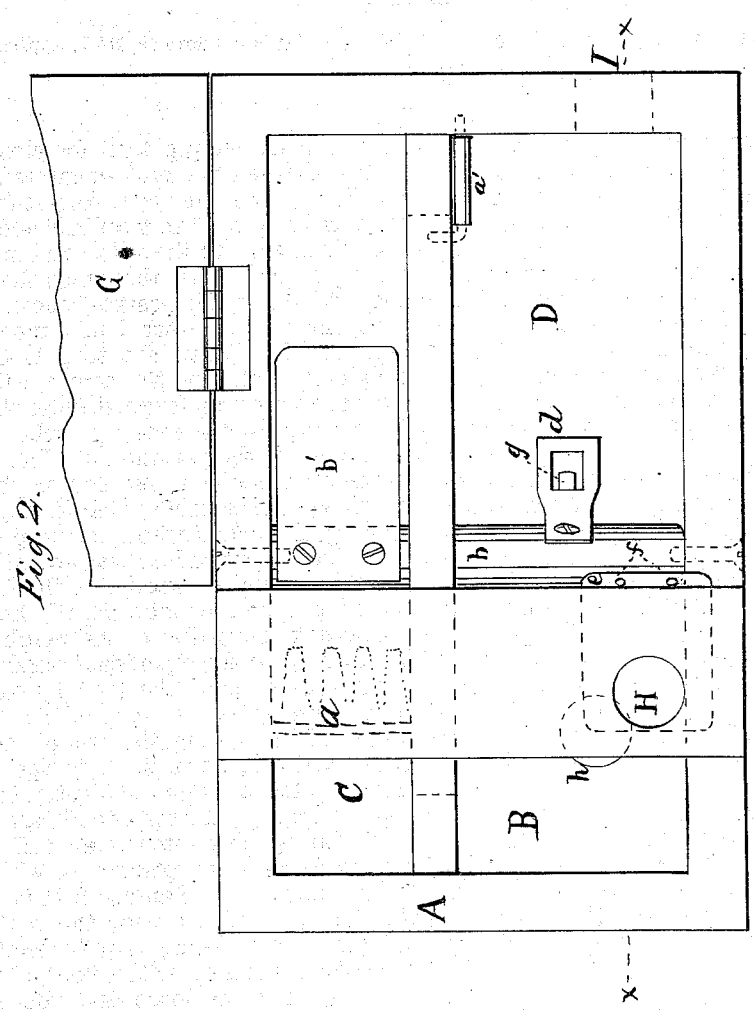

Figure 1 is a sectional elevation on the line $x\ x$, with a portion of a middle portion broken away, and Fig. 2 is a plan view of my invention.

A is a rectangular box, divided by suitable partitions into the chambers B, C, D, and E. The chambers B, C, and D are closed by the doors F G. The chamber E is open on under side, and in it are arranged a portion of the operating devices of the trap. H is the opening or passage through which the rats enter the box, and I is the passage through which they make their exit. $a\ a'$ are two hinged falling gates or traps arranged in and between the chambers C D. They permit the rat to pass from the chamber B to D, but prevent his return. $b$ is an axle, having its ends pivoted in the sides of the box A, and to which are secured a part of the operating devices of the trap. $b'$ is a treadle, secured to the upper side of the axle $b$ and arranged in the chamber C. $c$ is a bent arm or lever. One end is secured to the under side and near the center of axle $b$. To its other end is attached the weight $c'$ in the chamber E. $d$ is an arm or lever, secured to the under side of the axle, and extends downward. Its lower end is slotted to receive and hold the end of the trigger. $e$ is the sliding trap for closing the entrance H when the rat has entered the chamber B. $f f$ are two arms, connecting the axle with the trap $e$. The treadle $b'$ and arms $c\ d\ f$ are so attached to the axle $b$ and arranged relatively to each other that when the trap is set they will be in the position shown in Fig. 1, with the trap $e$ thrown back, uncovering the entrance H. When the trap is sprung the weight $c'$, acting on the arm $c$, will turn the axle, slide the trap forward, close the entrance H, and imprison the rat. $g$ is the trigger. It is pivoted to the partition $k$. The inner end, in the chamber D, is beveled or pointed, and provided with suitable notch for engaging and holding the arm $d$ when the trap is set. Its outer end is pivoted to the actuating-treadle $h$. $g'$ is a weight, attached to the inner end of the trigger, and is made slightly heavier than the actuating-treadle; or the weight that may be attached to the top of said treadle. It prevents springing of the trap by other means than pressing on the top of the treadle, by reason of its holding the trigger steadily engaged with the arm $d$. $h$ is the actuating-treadle. Its lower end is pivoted to the outer end of trigger $g$. Its upper end passes through a suitable opening into chamber B. The trigger $g$ and arm $d$ are so arranged with reference to the axle $b$ and chamber B that the top of the treadle $h$ will be near the center of said chamber. A platform may be secured to the top of the treadle; or the floor of the chamber may be made loose, and the treadle secured to under side thereof, if desired.

The trap may be set at any time without opening the lids F G, by raising the arm $c$. This turns the axle, and brings the arm $d$ to engage with the trigger $g$.

A rat entering chamber B and touching the treadle $h$ springs the trap; the weight $c'$ falls, and by its action on the axle closes the entrance H. The rat being now imprisoned can find exit only into chamber C, passing under gate $a$, and over treadle $b'$, which had been thrown up in the springing of the trap. It forces said treadle down to the position shown in Fig. 1, and this acting on the axle resets the trap. It then passes under gate $a'$ into chamber D.

The several operating devices arranged in chamber D may be protected by a wire screen, or other suitable means.

The rats are taken from chamber D through the opening 1. If desired, this opening may be covered by a swinging gate, and a box or other suitable receptacle placed so that the rats may pass thereinto, that they may be more conveniently reached for destruction.

Having described my invention, what I claim, and desire to secure by Letters Patent, is—

1. The combination, with the trap $e$, axle $b$, and weight $c'$, of the arms $f$ and $d$, trigger $g$, and actuating-treadle $h$, as and for the purposes specified.

2. The combination, with the trap $e$, arms $f$, and treadle $b'$, of the axle $b$, arms $d$, trigger $g$, and weight $g'$, as and for the purposes specified.

In testimony that I claim the foregoing as my own I hereto affix my signature in presence of two witnesses.

HIRAM C. BURK.

Witnesses:
B. F. CROXTON,
JACOB SENTER.